United States Patent [19]

Garwood et al.

[11] Patent Number: 4,547,613
[45] Date of Patent: Oct. 15, 1985

[54] PROCESS FOR CONVERTING OLEFINS TO HIGH VISCOSITY INDEX LUBRICANTS

[75] Inventors: William E. Garwood, Haddenfield; Hans J. Schoennagel, Lawrenceville both of N.J.

[73] Assignee: Mobil Oil Corporation, New York, N.Y.

[21] Appl. No.: 629,371

[22] Filed: Jul. 10, 1984

Related U.S. Application Data

[63] Continuation-in-part of Ser. No. 359,395, Mar. 18, 1982, abandoned.

[51] Int. Cl.[4] .............................. C07C 3/10; C07C 3/20
[52] U.S. Cl. ...................................... 585/533; 585/408; 585/415; 502/77
[58] Field of Search ................... 502/64, 77; 585/533, 585/512, 502, 408, 415

[56] References Cited

U.S. PATENT DOCUMENTS

| | | | |
|---|---|---|---|
| 4,211,640 | 7/1980 | Garwood et al. | 208/255 |
| 4,227,992 | 10/1980 | Garwood et al. | 502/77 |
| 4,231,899 | 11/1980 | Chen et al. | 585/650 |
| 4,358,395 | 11/1982 | Haag et al. | 585/640 |

*Primary Examiner*—W. J. Shine
*Assistant Examiner*—A. Pal
*Attorney, Agent, or Firm*—A. J. McKillop; M. G. Gilman; L. G. Wise

[57] ABSTRACT

Hydrocarbon streams containing primarily olefins such as ethylene up to and inclusive of $C_{16}$ olefins are converted at elevated pressures to high viscosity index lube oil base stock by contacting them with a ZSM-5 type zeolite catalyst which has been conditioned by previous contact with a light olefin preferably of 3-6 carbon atoms per molecule under suitable conditions of temperature and pressure.

14 Claims, 1 Drawing Figure

FIGURE
VISCOSITY INDEX OF 650°F + LUBE STOCK
vs. CARBON NUMBER OF CHARGE

FIGURE
VISCOSITY INDEX OF 650°F+LUBE STOCK
vs. CARBON NUMBER OF CHARGE

PROCESS FOR CONVERTING OLEFINS TO HIGH VISCOSITY INDEX LUBRICANTS

CROSS-REFERENCE TO RELATED APPLICATIONS

This application is a continuation-in-part of Ser. No. 359,395, filed Mar. 18, 1982, now abandoned.

NATURE OF THE INVENTION

This invention relates to a method for converting olefins to a hydrocarbon oil of low pour point, and high viscosity index suitable as a novel lube oil base stock. More particularly, this invention is concerned with such a conversion process utilizing a porous crystalline zeolite material as a catalyst and the products of said conversion.

BACKGROUND OF THE INVENTION

The conversion of ethylene to LPG and gasoline is described in a number of United States patents. For example, U.S. Pat. No. 4,100,218 discloses an ethane conversion process wherein ethane is converted to LPG and gasoline or aromatics concentrate in a combination process which comprises directly passing olefin effluent from the thermal cracking of ethane over a special crystalline aluminosilicate zeolite of the ZSM-5 type and recovering aromatics and $C_3^+$ hydrocarbons. In U.S. Pat. No. 4,150,062, olefins of 2-4 carbon atoms are converted to high octane olefinic gasoline components by contacting a light olefin feedstock with a catalyst comprising a crystalline aluminosilicate zeolite in the presence of a relatively large amount of co-fed water.

U.S. Pat. No. 4,227,992 discloses a process for separating ethylene in admixture with light olefins by contacting the mixture under suitable conditions with a catalyst such as a zeolite of the ZSM-5 type so as to selectively convert the propylene and higher olefins to both gasoline and fuel oil.

SUMMARY OF THE INVENTION

Briefly stated, this invention comprises a process for converting light olefins into a high viscosity index lubricating oil stock by contacting at elevated pressures said light olefins with a crystalline zeolite catalyst of the ZSM-5 type that has been conditioned by contact with an olefin of the $C_2$–$C_{16}$ carbon atom range at lower pressures. In another aspect, this invention comprises the zeolite catalyst produced from the aforedescribed conditioning process. In still another facet, this invention comprises the process for conditioning the zeolite catalyst as described above.

DESCRIPTION OF THE PREFERRED EMBODIMENT

The novel process of this invention is directed toward contacting a hydrocarbon stream containing primarily olefins such as ethylene up to and inclusive of $C_{16}$ olefins with a zeolite of the ZSM-5 type which has been specifically preconditioned for the process. This contacting is conducted under very specific reaction conditions so as to selectively react the olefins to produce a lube oil base stock. One essential element is that the preconditioning and the conversion are carried out at different pressures.

The crystalline zeolites utilized herein are members of a novel class of zeolitic materials which exhibit unusual properties. Although these zeolites have unusually low alumina contents, i.e., high silica-to-alumina mole ratios, they are very active even when the silica-to-alumina mole ratio exceeds 30. The activity is surprising since catalytic activity is generally attributed to framework aluminum atoms and/or cations associated with these aluminum atoms. These zeolites retain their crystallinity for long periods in spite of the presence of steam at high temperature which induces irreversible collapse of the framework of other zeolites, e.g., of the X and A type. Furthermore, carbonaceous deposits, when formed, may be removed by burning at higher than usual temperatures to restore activity. These zeolites used as catalysts, generally have low coke-forming activity and therefore are conducive to long times on-stream between regenerations by burning carbonaceous deposits with oxygen-containing gas such as air.

An important characteristic of the crystal structure of this novel class of zeolites is that it provides a selective constrained access to and egress from the intracrystalline free space by virtue of having an effective pore size intermediate between the small pore Linde A and the large pore Linde X, i.e., the pore windows of the structure are of about a size such as would be provided by 10-membered rings of silicon atoms interconnected by oxygen atoms. It is to be understood, of course, that these rings are those formed by the regular disposition of the tetrahedra making up the anionic framework of the crystalline zeolite, the oxygen atoms themselves being bonded to the silicon (or aluminum, etc.) atoms at the centers of the tetrahedra.

The silica-to-alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with silica-to-alumina mole ratios of at least 12 are useful, it is preferred in some instances to use zeolites having substantially higher silica-to-alumina ratios, e.g., 1600 and above. In addition, zeolites as otherwise characterized herein but which are substantially free of aluminum, that is zeolites having silica to alumina mole ratios of up to infinity, are found to be useful and even preferable in some instances. Such "high silica" or "highly siliceous" zeolites are intended to be included within this description. Also included within this definition are substantially pure silica analogs of the useful zeolites described herein, that is to say those zeolites having no measurable amount of aluminum (silica-to-alumina mole ratio of infinity) but which otherwise embody the characteristics disclosed.

The novel class of zeolites referred to herein as ZSM-5 type, after activation, acquire an intracrystalline sorption capacity for normal hexane which is greater than that for water, i.e., they exhibit "hydrophobic" properties. This hydrophobic character can be used to advantage in some applications.

The novel class of zeolites useful herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross-section than normal hexene is excluded and the zeolite is not of the desired type. Windows of 10-membered rings are preferred although, in some instances excessive puckering of the rings or pore blockage may render these zeolites ineffective.

Although 12-membered rings, in theory, would not offer sufficient constraint to produce advantageous conversions, it is noted that the puckered 12-ring structure of TMA offretite does show some constrained access. Other 12-ring structures may exist which may be operative for other reasons and, therefore, it is not the present intention to entirely judge the usefulness of a particular zeolite solely from theoretical structural considerations.

Rather than attempt to judge from crystal structure whether or not a zeolite possesses the necessary constrained access to molecules of larger cross-section than normal paraffins, a simple determination of the "Constraint Index" as herein defined may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. for at least 15 minutes. The zeolite is then flushed with helium and the temperature is adjusted between 290° C. and 510° C. to give an overall conversion of between 10% and 60%. The mixture of hydrocarbons is passed at 1 liquid hourly space velocity (i.e., 1 volume of liquid hydrocarbon per volume of zeolite per hour) over the zeolite with a helium dilution to give a helium to (total) hydrocarbon mole ratio of 4:1. After 20 minutes on stream, a sample of the effluent is taken and analyzed, most conveniently by gas chromatography, to determine the fraction remaining unchanged for each of the two hydrocarbons.

While the above experimental procedure will enable one to achieve the desired overall conversion of 10% to 60% for most zeolite samples and represents preferred conditions, it may occasionally be necessary to use somewhat more severe conditions for samples of very low activity, such as those having an exceptionally high silica-to-alumina mole ratio. In those instances, a temperature of up to about 540° C. and a liquid hourly space velocity of less than one, such as 0.1 or less, can be employed in order to achieve a minimum total conversion of about 10%. The "Constraint Index" is calculated as follows:

$$\text{Constraint Index} = \frac{\log_{10}(\text{fraction of hexane remaining})}{\log_{10}(\text{fraction of 3-methylpentane remaining})}$$

The Constraint Index approximates the ratio of the cracking rate constants for the two hydrocarbons. Zeolites suitable for the present invention are those having a Constraint Index of 1 to 12. Constraint Index (CI) values for some typical materials are:

|  | C.I. |
| --- | --- |
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| ZSM-48 | 3.4 |
| TMA Offretite | 3.7 |
| Clinoptilolite | 3.4 |
| Beta | 0.6 |
| H-Zeolon (mordenite) | 0.4 |
| REY | 0.4 |
| Amorphous Silica-Alumina | 0.6 |
| Erionite | 38 |

The above-described Constraint Index is an important and even critical definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables such as crystal size of the zeolite, the presence of occluded contaminants, etc., may affect the Constraint Index. Therefore, it will be appreciated that it may be possible to so select test conditions as to establish more than one value in the range of 1 to 12 for the Constraint Index of a particular zeolite. Such a zeolite exhibits the constrained access as herein defined and is to be regarded as having a Constraint Index in the range of 1 to 12. Also contemplated herein as having a Constraint Index in the range of 1 to 12 and therefore within the scope of the defined novel class of highly siliceous zeolites are those zeolites which, when tested under two or more sets of conditions within the above-specified ranges of temperature and conversion, produce a value of the Constraint Index slightly less than 1, e.g., 0.9, or somewhat greater than 12, e.g., 14 or 15, with at least one other value within the range of 1 to 12. Thus, it should be understood that the Constraint Index value as used herein is an inclusive rather than an exclusive value. That is, a crystalline zeolite when identified by any combination of conditions within the testing definition set forth herein as having a Constraint Index in the range of 1 to 12 is intended to be included in the instant novel zeolite definition whether or not the same identical zeolite, when tested under other of the defined conditions, may give a Constraint Index value outside of the range of 1 to 12.

The class of zeolites defined herein as of the ZSM-5 type is exemplified by ZSM-5, ZSM-11, ZSM-12, ZSM-22, ZSM-23, ZSM-35, ZSM-38, ZSM-48, ZSM-50, and other similar materials.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-22 can be suitably prepared from a reaction mixture containing a source of silica, an alkane diamine, an alkali metal oxide or an alkaline earth metal oxide, e.g., sodium, potassium, cesium, calcium or strontium, water, and alumina, and having a composition, in terms of mole ratios of oxides, falling within the following ratios:

| Reactants = | Broad | Preferred |
|---|---|---|
| $SiO_2/Al_2O_3 =$ | 20 to ∞ | 30 to 1000 |
| $H_2O/SiO_2 =$ | 10 to 100 | 20 to 60 |
| $OH^-/SiO_2 =$ | 0 to 0.3 | 0.1 to 0.2 |
| $M^+/SiO_2 =$ | 0 to 2.0 | 0.1 to 1.0 |
| $RN/SiO_2 =$ | 0.01 to 2.0 | 0.05 to 1.0 | wherein RN is a functional group of a $C_2$-$C_{12}$ alkane diamine of the type $H_2N$-$(CH_2)_n$-$NH_2$ (abbreviated $C_nDN$), n=2 to 12, and preferably is 5 to 8, and M is an alkali metal or an alkaline earth metal and maintaining the mixture at crystallization temperature until crystals of the ZSM-22 zeolite are formed. Thereafter, the crystals are separated from the liquid by any conventional means, washed and recovered.

Crystallization can be carried out at either static or stirred conditions in a reactor vessel, e.g., a polypropylene jar, teflon lined or stainless steel autoclaves, at 80° C. (176° F.) to about 210° C. (410° F.) for about 6 hours to 150 days. Thereafter, the crystals are separated from the liquid and recovered. The compositions can be prepared utilizing materials which supply the appropriate oxide. Such materials include aluminates, alumina, silicates, sodium silicate, silica hydrosol, silica gel, silicic acid, sodium, potassium or cesium hydroxide, and an alkane diamine. Suitable diamines are, e.g., ethanediamine, propanediamine, butanediamine, pentanediamine, hexanediamine, heptanediamine, octane-diamine, nonanediamine, decanediamine, undecanediamine, duodecane-diamine. The reaction mixture can be prepared either batchwise or continuously. Crystal size and crystallization time of the new crystalline material will vary with the nature of the reaction mixture employed and the crystallization conditions.

As set forth above, the ZSM-22 zeolite can be prepared at a relatively wide range of $SiO_2/Al_2O_3$ ratios of about 20 to about infinity (∞). However, it has been found that larger alkali metal cations, e.g., $K+$ and $Cs+$, are preferably used at the $SiO_2/Al_2O_3$ ratios of about 20 to about 90 to obtain ZSM-22 crystals substantially free of impurities or other zeolites. The potassium ($K+$) cation is preferred at such low $SiO_2/Al_2O_3$ ratios because cesium (Cs) appears to decrease the reaction rate. At the $SiO_2/Al_2O_3$ ratios of 90 or above, smaller cations, e.g., sodium ($Na+$) cations, are preferably used to produce substantially 100% crystalline ZSM-22.

The ZSM-22 zeolite also may contain a relatively minor amount of $Al_2O_3$ and therefore can produce a product with a $SiO_2$ to $Al_2O_3$ ratio of about 20 to about ∞. In the as-synthesized form, the ZSM-22 has a calculated composition, in terms of moles of oxides, after dehydration, per 100 moles of silica, as follows:

(0.02 to 10)RN:(0 to 2)$M_2/n^0$:(0 to 5)$Al_2O_3$:100$SiO_2$ wherein RN is a functional group of $C_2$-$C_{12}$ alkane diamine and M is an alkali metal or an alkaline earth metal having a valence n, e.g., Na, K, Cs, Li, Ca or Sr.

ZSM-22 can further be identified by its sorptive characteristics and its X-ray diffraction pattern. The original cations of the as-synthesized ZSM-22 may be replaced at least in part by other ions using conventional ion exchange techniques. It may be necessary to precalcine the ZSM-22 zeolite crystals prior to ion exchange. The replacing ions introduced to replace the original alkali, alkaline earth and/or organic cations may be any that are desired so long as they can pass through the channels within the zeolite crystals. Desired replacing ions are those of hydrogen, rare earth metals, metals of Groups IB, IIA, IIB, IIIA, IIIB, IVA, IVB, VIB and VIII of the Periodic Table. Among the metals, those particularly preferred are rare earth metals, manganese, zinc and those of Group VIII of the Periodic Table.

ZMS-22 zeolite described herein has a definite X-ray diffraction pattern, set forth below in Table I, which distinguishes it from other crystalline materials.

TABLE 1

| Most Significant Lines of ZSM-22 | |
|---|---|
| Interplanar d-spacings (Å) | Relative Intensity |
| 10.9 ± 0.2 | M–VS |
| 8.7 ± 0.16 | W |
| 6.94 ± 0.10 | W–M |
| 5.40 ± 0.08 | W |
| 4.58 ± 0.07 | W |
| 4.36 ± 0.07 | VS |
| 3.68 ± 0.05 | VS |
| 3.62 ± 0.05 | S–VS |
| 3.47 ± 0.04 | M–S |
| 3.30 ± 0.04 | W |
| 2.74 ± 0.02 | W |
| 2.52 ± 0.02 | W |

These values were determined by standard techniques. The radiation was the K-alpha doublet of copper and a diffractometer equipped with a scintillation counter and an associated computer were used. The peak heights, I, and the positions as a function of 2 theta, where theta is the Bragg angle, were determined using algorithms on the computer associated with the spectrometer. From these, the relative intensitites, 100 $I/I_o$, where $I_o$ is the intensity of the strongest line or peak, and d (obs.) the interplanar spacing in Angstroms (Å), corresponding to the recorded lines, were determined. In Table 1, the relative intensities are given in terms of. the symbols VS=very strong, S=strong, M=medium, W=weak, etc. It should be understood that this X-ray diffraction pattern is characteristic of all the species of ZSM-22 zeolite compositions. Ion exchange of the alkali or alkaline earth metal cations with other ions results in a zeolite which reveals substantially the same X-ray diffraction pattern as that of Table 1 with some minor shifts in the interplanar spacing and variations in relative intensity. Other minor variations can occur, depending on the silica to alumina ratio of the particular sample, as well as its degree of thermal treatment.

ZSM-22 is described in greater detail in U.S. application Ser. No. 373,452, filed Apr. 30, 1982, now abandoned.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 can be identified, in terms of moles of anhydrous oxides per 100 moles of silica, as follows:

$$(0-15)RN:(0-1.5)M_{2/n}O:(0.2)Al_2O_3:(100)SiO_2$$

wherein:

M is at least one cation having a valence n; and

RN is a $C_1$–$C_{20}$ organic compound having at least one amine functional group of $pK_a$ 7.

It is recognized that, particularly when the composition contains tetrahedral framework aluminum, a fraction of the amine functional groups may be protonated. The doubly protonated form, in conventional notation, would be $(RNH)_2O$ and is equivalent in stoichiometry to 2 $RN+H_2O$. The characteristic X-ray diffraction pattern of the synthetic zeolite ZSM-48 has the following significant lines:

| Characteristic Lines of ZSM-48 | |
| --- | --- |
| d (Angstroms) | Relative Intensity |
| 11.9 | W-S |
| 10.2 | W |
| 7.2 | W |
| 5.9 | W |
| 4.2 | VS |
| 3.9 | VS |
| 3.6 | W |
| 2.85 | W |

These values were determined by standard techniques. The radiation was the K-alpha doublet of copper, and a scintillation counter spectrometer with a strip chart pen recorder was used. The peak heights, I, and the Positions as a function of 2 times theta, where theta is the Bragg angle, were read from the spectrometer chart. From these, the relative intensities, 100 $I/I_o$, where $I_o$ is the intensity of the strongest line or peak, and d (obs.), the interplanar spacing in Angstroms, corresponding to the recorded lines, were calculated. In the foregoing table, the relative intensities are given in terms of the symbols W=weak, VS=very strong, and W-S=weak-to-strong. Ion exchange of the sodium ion with cations reveals substantially the same pattern with some minor shifts in interplanar spacing and variation in relative intensity. Other minor variations can occur depending on the silicon-to-aluminum ratio of the particular sample, as well as if it has been subjected to thermal treatment.

The ZSM-48 can be prepared from a reaction mixture containing a source of silica, water, RN, an alkali metal oxide (e.g., sodium) and, optionally, alumina. The reaction mixture should have a composition, in terms of mole ratios of oxides, falling within the following ranges:

| Reactants | Broad | Preferred |
| --- | --- | --- |
| $Al_2O_3/SiO_2$ = | 0 to 0.02 | 0 to 0.01 |
| $Na/SiO_2$ = | 0 to 2 | 0.1 to 1.0 |
| $RN/SiO_2$ = | 0.01 to 2.0 | 0.05 to 1.0 |
| $OH^-/SiO_2$ = | 0 to 0.25 | 0 to 0.1 |
| $H_2O/SiO_2$ = | 10 to 100 | 20 to 70 |

| Reactants | Broad | Preferred |
| --- | --- | --- |
| $H^+(added)SiO_2$ = | 0 to 0.2 | 0 to 0.05 | wherein RN is a $C_1$–$C_{20}$ organic compound having amine functional group of $pK_a \geq 7$. The mixture is maintained at 80°–250° C. until crystals of the material are formed. H+(added) is moles acid added in excess of the moles of hydroxide added. In calculating H+(added) and OH values, the term acid (H+) includes both hydronium ion, whether free or coordinated, and aluminum. Thus, aluminum sulfate, for example, would be considered a mixture of aluminum oxide, sulfuric acid, and water. An amine hydrochloride would be a mixture of amine and HCl. In preparing the highly siliceous form of ZSM-48 no alumina is added. Thus, the only aluminum present occurs as an impurity in the reactants.

Preferably, crystallization is carried out under pressure in an autoclave or static bomb reactor at 80° C. to 250° C. Thereafter, the crystals are separated from the liquid and recovered. The composition can be prepared utilizing materials which supply the appropriate oxide. Such compositions include sodium silicate, silica hydrosol, silica gel, silicic acid, RN, sodium hydroxide, sodium chloride, aluminum sulfate, sodium aluminate, aluminum oxide, or aluminum itself. RN is a $C_1$–$C_{20}$ organic compound containing at least one amine functional group of $pK_a \geq 7$, as defined above, and includes such compounds as $C_3$–$C_{18}$ primary, secondary, and tertiary amines, cyclic amine (such as piperidine, pyrrolidine and piperazine), and polyamines such as $NH_2$-$C_nH_{2n}$-$NH_2$ wherein n is 4–12.

ZSM-50 can be prepared from a reaction mixture containing sources of an alkali or alkaline earth metal oxide, an oxide of aluminum, an oxide of silicon, an organic cation of a Group VA element of the Periodic Table and water and having a composition, in terms of mole ratios of oxides, falling within the following ranges:

| Reactants | Useful | Preferred |
| --- | --- | --- |
| $SiO_2/Al_2O_3$ | 20 to 100 | 30 to 90 |
| $OH^-/SiO_2$ | 0.1 to 0.6 | 0.1 to 0.3 |
| $R/SiO_2$ | 0.05 to 0.6 | 0.1 to 0.3 |
| $M/SiO_2$ | 0.01 to 1.0 | 0.1 to 0.6 | wherein R is an organic cation of a Group VA element of the Periodic Table of the Elements and M is an alkali or alkaline earth metal.

Crystallization of ZSM-50 can be carried out at either static or stirred condition in a suitable reactor vessel, such as for example, polypropylene jars or teflon lined or stainless steel autoclaves. The total useful range of temperatures for crystallization is from about 100° C. to about 200° C. for a time of about 48 hours to about 15 days. Thereafter, the crystals are separated from the liquid and recovered. The composition can be prepared utilizing materials which supply the appropriate oxides. Such compositions may include sodium silicate, silica hydrosol, silica gel, silicic acid, sodium hydroxide, a source of aluminum, and an appropriate organic compound. The organic compounds contain an element of Group VA, such as nitrogen or phosphorus.

In the synthesized form, zeolite ZSM-50 has a formula, on an anhydrous basis and in terms of moles of oxides per 100 moles of silica, as follows:

$(0-4)R_2O:(0-10)M_{2/n}O:(1-5)Al_2O_3: (100)SiO_2$ wherein M is an alkali or alkaline earth metal, n is the valence of M, and R is an organic cation of a Group VA element of the Periodic Table of the Elements (Sargent-Welch Scientific Company).

ZSM-50 zeolite described herein has a definite X-ray diffraction pattern which distinguishes it from other crystalline materials. The X-ray diffraction pattern of zeolite ZSM-50 has the following significant lines as set forth in the following table:

TABLE 2

| Interplanar d-Spacing (A) | Relative Intensity, I/Io | |
|---|---|---|
| 20.1 | .3 | W |
| 11.1 | .17 | S |
| 10.1 | .16 | M |
| 9.7 | .14 | W |
| 5.77 | .09 | W |
| 5.61 | .09 | W |
| 4.64 | .07 | M |
| 4.35 | .07 | M |
| 4.30 | .07 | VS |
| 4.00 | .06 | S |
| 3.85 | .06 | M |
| 3.70 | .06 | M |
| 3.42 | .05 | W |
| 3.35 | .05 | W |
| 3.27 | .05 | M |
| 3.24 | .05 | W |
| 2.94 | .04 | W |
| 2.53 | .04 | W |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the spectrometer. From these, the relative intensities, 100 I/I$_o$, where I$_o$ is the intensity of the strongest line or peak, and d (obs.) the interplanar spacing in Angstrom Units (A), corresponding to the recorded lines, were determined. In Table 2, the relative intensities are given in terms of the symbols: W=weak, M=medium, S=strong and VS=very strong. In terms of intensities, these may be generally designated as follows: W=0 to 20; M=20 to 40; S=40 to 60; and VS=60 to 100. It should be understood that this X-ray diffraction pattern is characteristic of all the species of zeolite ZSM-50 compositions. The sodium form as well as other cationic forms reveal substantially the same pattern with some minor shifts in interplanar spacing and variation in relative intensity. Other minor variations can occur, depending on the silicon to aluminum ratio of the particular sample, as well as its degree of thermal treatment.

ZSM-50 is described in greater detail in U.S. Ser. No. 386,456, filed June 8, 1982, the disclosure of which is incorporated herein by reference.

It is to be understood that by incorporating by reference the foregoing patents to describe examples of specific members of the novel class with greater particularity, it is intended that identification of the therein disclosed crystalline zeolites be resolved on the basis of their respective X-ray diffraction patterns. As discussed above, the present invention contemplates utilization of such catalysts wherein the mole ratio of silica to alumina is essentially unbounded. The incorporation of the identified patents should therefore not be construed as limiting the disclosed crystalline zeolites to those having the specific silica-to-alumina mole ratios discussed therein, it now being known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material.

The specific zeolites described, when prepared in the presence of organic cations, are substantially catalytically inactive, possibly because the intra-crystalline free space is occupied by organic cations from the forming solution. They may be activated by heating in an inert atmosphere at 540° C. for one hour, for example, followed by base exchange with ammonium salts followed by calcination at 540° C. in air. The presence of organic cations in the forming solution may not be absolutely essential to the formation of this type zeolite; however, the presence of these cations does appear to favor the formation of this special class of zeolite. More generally, it is desirable to activate this type catalyst by base exchange with ammonium salts followed by calcination in air at about 540° C. for from about 15 minutes to about 24 hours.

Natural zeolites may sometimes be converted to zeolite structures of the class herein identified by various activation procedures and other treatments such as base exchange, steaming, alumina extraction and calcination, alone or in combinations. Natural minerals which may be so treated include ferrierite, brewsterite, stilbit, dachiardite, epistilbite, heulandite, and clinoptilolite.

The preferred crystalline zeolites for utilization herein include ZSM-5, ZSM-11, ZSM-12, ZSM-22, ZSM-23, ZSM-35, ZSM-38, ZSM-48, and ZSM-50, with ZSM-5 being particularly preferred.

In a preferred aspect of this invention, the zeolites hereof are selected as those providing, among other things, a crystal framework density, in the dry hydrogen form, of not less than about 1.6 grams per cubic centimeter. It has been found that zeolites which satisfy all three of the discussed criteria are most desired for several reasons. When hydrocarbon products or by-products are catalytically formed, for example, such zeolites tend to maximize the production of gasoline boiling range hydrocarbon products. Therefore, the preferred zeolites useful with respect to this invention are those having a Constraint Index as defined above of about 1 to about 12, a silica-to-alumina mole ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on Page 19 of the article "Zeolite Structure" by W. M. Meier. This paper, the entire contents of which are incorporated herein by reference, is included in *Proceedings of the Conference on Molecular Sieves*, (London, April 1967) published by the Society of Chemical Industry, London, 1968.

When the crystal structure is unknown, the crystal framework density may be determined by classical pycnometer techniques. For example, it may be determined by immersing the dry hydrogen form of the zeolite in an organic solvent which is not sorbed by the crystal. Or, the crystal density may be determined by mercury porosimetry, since mercury will fill the interstices between crystals but will not penetrate the intracrystalline free space.

It is possible that the unusual sustained activity and stability of this special class of zeolites is associated with its high crystal anionic framework density of not less than about 1.6 grams per cubic centimeter. This high density must necessarily be associated with a relatively small amount of free space within the crystal, which might be expected to result in more stable structures. This free space, however, is important as the locus of catalytic activity. Crystal framework densities of some typical zeolites, including some which are not within the purview of this invention, are:

|  | Void Volume | Framework Density |
|---|---|---|
| Ferrierite | 0.28 cc/cc | 1.76 g/cc |
| Mordenite | .28 | 1.7 |
| ZSM-5, −11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form to yield the hydrogen form. In addition to the hydrogen form, other forms of the zeolite wherein the original alkali metal has been reduced to less than about 1.5 percent by weight may be used. Thus, the original alkali metal of the zeolite may be replaced by ion exchange with other suitable metal cations of Groups I through VIII of the Periodic Table, including, by way of example, nickel, copper, zinc, palladium, calcium or rare earth metals.

In practicing a particularly desired chemical conversion process, it may be useful to incorporate the above-described crystalline zeolite with a matrix comprising another material resistant to the temperature and other conditions employed in the process. Such matrix material is useful as a binder and imparts greater resistance to the catalyst for the severe temperature, pressure and reactant feedstream velocity conditions encountered in many cracking processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix, on an anhydrous basis, may vary widely with the zeolite content ranging from between about 1 to about 99 percent by weight and more usually in the range of about 5 to about 80 percent by weight of the dry composite.

In the novel process of this invention, the zeolite catalyst used is conditioned by being contacted with a light olefin or olefin mixture before the olefins to be converted to lube stock are contacted therewith. Preferably the conditioning olefin is one or a mixture of olefins having an average of 3–6 carbon atoms per molecule, but it can be a mixture of olefins ranging from 2 to 16 in average number of carbon atoms per molecule. The most preferred olefin is propylene. The zeolite catalyst is contacted with this gaseous olefin at temperatures ranging from 400° to 1000° F. and preferably from 450° F. to 900° F. at 0 to 100 psig. The contacting is preferably carried out for a time period of between 1 and 70 hours. Subsequent to this conditioning step for the zeolite, a gaseous paraffinic feed containing a high percentage of an olefin such as propylene is contacted at a higher pressure with the conditioned ZSM-5 type crystalline zeolite catalyst in the reaction zone which preferably is a fixed bed. In a typical embodiment of the process of this invention, the stream of high propylene content is introduced into the reaction zone at a temperature within the range of 350° F. to 650° F., a pressure within the range of 400 to 5000 psig and a WHSV of 0.1 to 10. The olefin feedstock can be a mixture of olefins having an average number of carbon atoms per molecule of 2 to 16. A preferred feedstock is one in which the average number is 3–6 carbon atoms per molecule. The most preferred feedstock is propylene.

Preferred conditions for this operation are a temperature of 400° to 600° F., a pressure of 400 to 2000 psig, and a WHSV of 0.2 to 1. The effluent from this reaction zone is then separated and is fractionated to recover the desired lube oil base stock which preferably will have a boiling point of above about 600° F. The gaseous overhead from this preparation can be recycled to the process for conversion to the higher boiling point hydrocarbon material. Ordinarily, it will be desirable to subject the lube fraction to a conventional hydrogenation step to stabilize the fraction. This is done using any conventional hydrogenation catalyst such as nickel on kieselguhr at temperatures ranging from 300° to 800° F. and pressures of 100 to 1000 psig.

In all the Examples described below, converting olefins to lube product, the zeolite catalyst was an acid ZSM-5 extrudate in which the silica-to-alumina ratio was 40 to 1 and the composition of the extrudate was 65% ZSM-5 and 35% alumina binder by weight. Reaction conditions were 1500 psig, weight hourly space velocities (WHSV) 0.5–0.6, and average catalyst temperatures for the periods on-stream were 416° to 499° F.

EXAMPLE 1

In Examples 1–9, different olefins were charged over HZSM-5 zeolite for a total on-stream time of 27.4 days (Table 1) with no regeneration. For the first 3.6 days, isobutylene was charged at an average catalyst temperature of 417° F. Liquid recovery was 98.4 weight percent, and yield of approximately 650° F.+ lube product 20 weight percent, pour point −50° F., and viscosity index 63.3. This example represents an operation outside the invention.

EXAMPLE 2

In the 3.6–6.4 days on stream (DOS) period, 1-hexene was charged at an average catalyst temperature of 449° F. Liquid recovery was 99.4 weight percent, and yield of approximately 650° F.+ lube product 16 weight percent, pour point −70° F., and viscosity index 105.6. This example represents an operation outside the invention.

EXAMPLE 3

Isobutylene was charged at 6.4 to 7.3 days on stream at an average catalyst temperatures of 473° F. Liquid recovery was 98.8 weight percent, and yield of 650° F.+ product was essentially the same as that of Example 1 (20 weight percent vs. 19 weight percent). This Example represents an operation outside this invention.

EXAMPLE 4

Propylene was charged at 7.3 days on stream. At 10 days on stream the charge was changed to 1-hexene, 0.5 WHSV, 1500 psig, 450° F. After approximately 8 hours the rupture disc blew, following which the catalyst "soaked" in the hexene fill at 450° F., atmospheric pressure, no hydrocarbon flow, for 57 hours. At that point, the propylene flow was continued for another 2.3 days at a pressure of 1500 psig. Average catalyst temperature for the total 7.3–12.3 days on stream was 461° F., liquid recovery 98.9 weight percent, yield of approximately 650° F.+ lube product 20 weight percent, pour point −70° F., and viscosity index 96.5. This example represents an operation partially outside this invention (until the soak at atmospheric pressure).

EXAMPLE 5

1-Decene was charged at 12.3–17.1 days on stream, average catalyst temperature 451° F. Liquid recovery was 99.8 weight percent, yield of approximately 650° F.+ lube product 19 weight percent, pour point −85° F., and viscosity index 136.4.

EXAMPLE 6

Propylene was charged at 17.1 to 17.9 days on stream at an average catalyst temperatures of 458° F. Liquid recovery was 99.0 weight percent, and yield of 650° F.+ product 16 weight percent, compared to 23 weight percent in Example 4.

EXAMPLE 7

1-Butene was charged at 17.9 to 20.8 days on stream at an average catalyst temperature of 452° F. Liquid recovery was 99.8 weight percent, and yield of approximately 650° F.+ lube product 12 weight percent, pour point −85° F., and viscosity index 105.5.

EXAMPLE 8

1-Hexene was again charged at 20.8 to 23.6 days on stream, average catalyst temperature 461° F. Liquid recovery was 99.9 weight percent, and yield of approximately 650° F.+ lube product 9 weight percent, pour point −60° F., and viscosity index 114.9. This compares with 105.6 for Example 2, before the soaking or "conditioning" that occurred in Example 4 (after the rupture disc blew).

EXAMPLE 9

A 67/13/20 weight percent blend of propylene/2-butene/isobutane was charged at 23.6–27.4 days on stream at an average catalyst temperature of 499° F. Liquid recovery was 85.6 weight percent, and yield of approximately 650° F.+ lube product 10 weight percent, pour point −65° F., and viscosity index 97.7.

TABLE 3

| Example | 1 | 2 | 3 | 4 | 5 | 6 | 7 | 8 | 9 |
|---|---|---|---|---|---|---|---|---|---|
| Catalyst - 40/1 SiO2/Al2O3 HZSM-5B Extrudate 1500 psig | | | | | | | | | |
| Time On-Stream, Days | 3.6 | 6.4 | 7.3 | 12.3[5] | 17.1 | 17.9 | 20.8 | 23.6 | 27.4 |
| Olefin Charge | ISO-$C_4^=$ | 1-$C_6^=$ | ISO-$C_4^=$ | $C_3^=$ | 1-$C_{10}^=$ | $C_3^=$ | 1-$C_4^=$ | 1-$C_6^=$ | $C_3^=$/2$C_4^=$/i$C_4$[4] |
| WHSV | 0.6 | 0.5 | 0.6 | 0.5 | 0.6 | 0.5 | 0.6 | 0.5 | 0.6 |
| Av. Cat Temp, °F. | 417 | 449 | 473 | 461 | 451 | 458 | 452 | 461 | 499 |
| Liquid Recovery wt % | 98.4 | 99.4 | 98.8 | 98.9 | 99.8 | 99.0 | 99.6 | 99.9 | 85.6 |
| 650° F.+, D-2887[1] | 19 | 21 | 20 | 23 | 17 | 16 | 11 | 13 | 16 |
| Lube Product Yield | | | | | | | | | |
| Weight Percent[2] | 20 | 16 | —[3] | 20 | 19 | —[3] | 12 | 9 | 10 |
| Gravity, °API | 37.1 | 38.1 | — | 38.7 | 38.7 | — | 39.2 | 37.4 | 38.0 |
| Specific | 0.8393 | 0.8343 | — | 0.8314 | 0.8314 | — | 0.8289 | 0.8378 | 0.8348 |
| Pour Point, °F. | −50 | −70 | — | −70 | −85 | — | −85 | −60 | −65 |
| KV at 40° C., cs | 25.41 | 23.64 | — | 19.96 | 27.48 | — | 13.27 | 27.50 | 24.00 |
| KV at 100° C., cs | 4.37 | 4.55 | — | 4.02 | 5.42 | — | 3.21 | 5.11 | 4.50 |
| Viscosity Index | 63.3 | 105.6 | — | 96.5 | 136.4 | — | 105.5 | 114.9 | 97.7 |

[1]Boiling Range by gas chromatographic Analysis, ASTM Test.
[2]By Single Plate Distillation of Liquid Product.
[3]Short Run Made to Check Catalyst Activity - insufficient sample for distillation.
[4]Weight Percent Ratio 67/13/20, 0.5 WHSV Based on Olefin.
[5]At 10 days on-stream, 1-hexene Charged for 28 hours at 0.5 WHSV, 1500 psig, 450° F. Pressure then decreased to atmospheric (rupture disc blew) 1-hexene flow stopped, catalyst kept at 450° F. for next 57 hours.

EXAMPLE 10

In this example, a fresh portion of the same ZSM-5 extrudate used in Examples 1–9 was placed in the reactor. The propylene/2-butene/isobutane blend of Example 9 was charged at 0 to 3.7 days on stream, average catalyst temperature 416° F. Liquid recovery was 82.1 weight percent, and yield of approximately 650° F.+ lube product 17 weight percent, pour point −55° F., viscosity index 77.0. This compares with 97.7 for Example 9 with the "conditioned" catalyst. This example clearly demonstrates that the products obtained by the process of this invention (Example 9) have a higher viscosity index than the products obtained by the process outside this invention (Example 10).

EXAMPLE 11

1-Decene was charged over the catalyst from Example 10 at 3.7 to 6.5 days on stream, average catalyst temperature 450° F. Liquid recovery was 99.2 weight percent, and yield of approximately 650° F.+ lube product 23 weight percent, pour point −75° F., viscosity index 130.2. This compares with 136.4 for the "conditioned" catalyst of Example 5.

EXAMPLE 12

The approximate 650° F.+ lube product from Example 5 charging 1-Decene over the conditioned catalyst was hydrogenated utilizing a conventional nickel-on-kieselguhr hydrogenation, catalyst (Girdler G-49B) at a temperature of 350°–400° F., and a pressure of 500 psig. The hydrogenated lube had a pour point of −70° F. and viscosity index of 132.8, compared to −85° F. and 136.4 for the charge. This example shows that the hydrogenation operation does not significantly alter the physical properties of this lube stock as measured by pour point and viscosity index.

Figure 1:
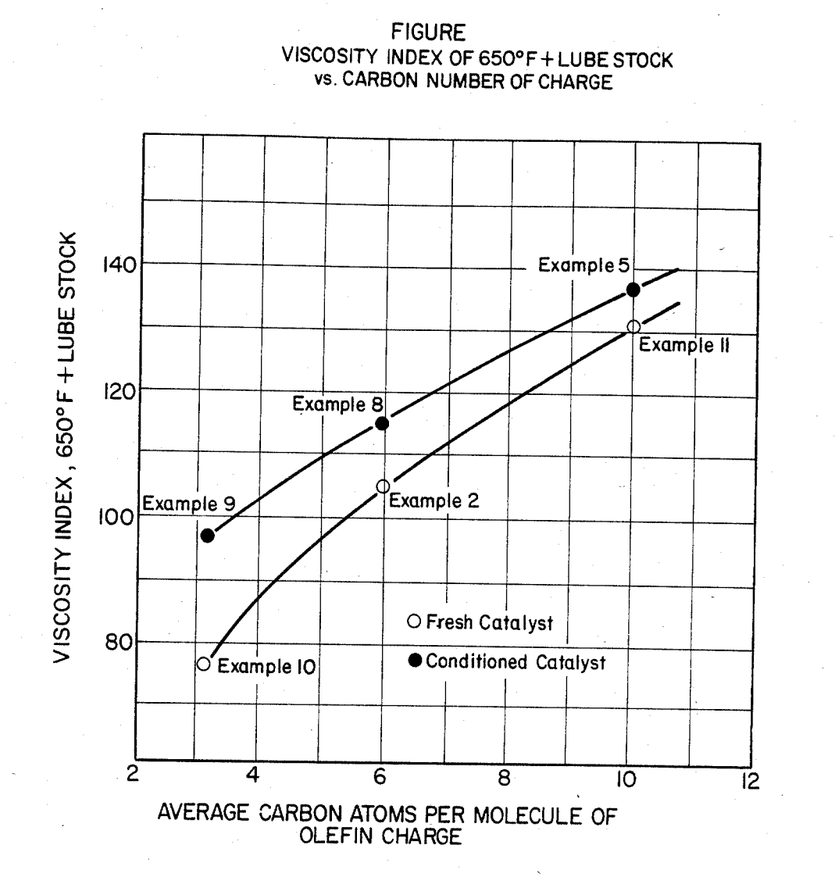
The accompanying FIGURE is a plot of the viscosity indices obtained when olefins of higher and lower carbon number are converted to a lube oil base stock according to the process of this invention.

A comparison of results with the fresh and conditioned catalyst is summarized in Table 2, and viscosity index versus carbon number of the olefin charge plotted in single Figure. The plot shows that the conditioning step makes the biggest improvement in viscosity index with the lower carbon number charge stocks.

| Catalyst | No Conditioning | Conditioned with 1-hexene 450° F., 30 psig, 3 hours |
|---|---|---|
| KV @ 40° C., cs | 38.87 | 28.27 |
| KV @ 100° C., cs | 5.68 | 4.81 |
| Viscosity Index | 78.0 | 84.1 |

Two additional runs were made in which the catalyst was conditioned with propylene at 900° F., 0.5 WHSV, 30 psig, for 3 and 16 hours. Propylene was then flowed over the catalyst at 400°–500° F., 0.5 WHSV, 1500 psig for periods of 4 to 6 days. The resultant product had the following properties:

| Catalyst | No Conditioning | 3 hours | 16 hours |
|---|---|---|---|
| Liquid Recovery, wt % | 96.6 | 96.0 | 97.0 |
| 650° F. Lube, wt % | 23 | 18 | 4 |
| Gravity, °API | 36.2 | 37.3 | 37.5 |
| Specific | 0.8438 | 0.8383 | 0.8373 |
| Pour Point, °F. | −50 | −55 | −40 |
| KV @ 40° C., cs | 38.87 | 26.33 | 20.87 |
| KV @ 100° C., cs | 5.68 | 4.63 | 4.17 |
| Viscosity Index | 78.0 | 86.2 | 100.9 |

The 16-hour conditioning run shows that very high V.I.'s can be obtained, but at the expense of yield. The degree of conditioning can thus be adjusted to obtain the desired V.I.-yield relationship. In commercial practice, the charge olefin would be most conveniently used for the conditioning step, this being propylene in the above case. For the conditioning step, the broad range

TABLE 4
COMPARISON OF FRESH AND CONDITIONED CATALYST

| EXAMPLE | 10 | 9 | 2 | 8 | 11 | 5 |
|---|---|---|---|---|---|---|
| | \multicolumn{6}{c}{$C_3=$/2-Butene/Isobutane} | | | | | |
| Charge | 67/13/20 | | 1-Hexene | | 1-Decene | |
| Catalyst | Fresh | Conditioned | Fresh | Conditioned | Fresh | Conditioned |
| Cat. Temp. °F. | 416 | 499 | 449 | 461 | 450 | 451 |
| 650° F. + Lube Yld, wt % | 21 | 11 | 16 | 9 | 23 | 20 |
| Gravity, °API | 36.3 | 38.0 | 38.1 | 37.4 | 38.4 | 38.7 |
| Pour Point, °F. | −55 | −65 | −70 | −60 | −75 | −85 |
| Kinematic Viscosity in centistokes at: | | | | | | |
| 40° C. | 28.26 | 24.00 | 23.64 | 27.50 | 26.29 | 27.48 |
| 100° C. | 4.74 | 4.50 | 4.55 | 5.11 | 5.18 | 5.42 |
| Viscosity Index | 77.0 | 97.7 | 105.6 | 114.9 | 130.2 | 136.4 |

EXAMPLE 13

The same fresh 40/1 SiO$_2$/Al$_2$O$_3$ acid form ZSM-5 extrudate composition used in the previous examples was conditioned with 1-hexene at 450° F., 0.5 WHSV, and 30 psig for 3 hours. Propylene was then processed over the catalyst at an average catalyst temperature of 426° F., 0.5 WHSV, 1500 psig for 4 days. An identical run was made, average catalyst temperature 424° F. on a portion of the catalyst which had not been conditioned. The 650° F. products so produced compare as follows:

| Catalyst | No Conditioning | Conditioned with 1-hexene 450° F., 30 psig, 3 hours |
|---|---|---|
| Liquid Recovery wt % | 96.6 | 96.4 |
| 650° F.+ Lube yield, wt % | 23 | 22 |
| Gravity, °API | 36.2 | 36.4 |
| Specific | 0.8438 | 0.8428 |
| Pour Point, °F. | −50 | −60 | of $C_2$–$C_{16}$ olefins can be charged at 400°–1000° F., 0–100 psig, 0.0 to 5 WHSV, for periods of 1–70 hours.

What is claimed is:

1. A process of converting an olefinic stream containing light olefins having an average of 2 to 16 carbon atoms per molecule to a high viscosity index lube oil charge stock comprising:
  (a) passing a light hydrocarbon gas of 3 to 6 carbon atoms per molecule over a ZSM-5 type catalyst to condition said catalyst at treating conditions of 0–100 psig, a temperature between about 400° F. and about 1000° F., and a weight hourly space velocity of between 0.1 and about 5;
  (b) thereafter passing over said treated catalyst an olefin feedstock comprising olefins of an average number of carbon atoms per molecule of 2 to 16 at a pressure of 400–5000 psig, a temperature of 350° F. to 650° F., and a WHSV of 0.1–1.0;
  (c) collecting the effluent stream therefrom; and (d) fractionating said effluent stream into a high boiling point lube oil stock fraction, having a viscosity index greater than that produced by unconditioned fresh catalyst.

2. The process of claim 1 wherein said crystalline zeolite is ZSM-5, ZSM-11, ZSM-12, ZSM-23, ZSM-35, ZSM-38, ZSM-48 or a zeolite having the X-ray diffraction pattern of Table 1 or Table 2 of the specification herein.

3. The process of claim 2 wherein said zeolite is an acid form.

4. The process of claim 1 wherein said zeolite consists essentially of HZSM-5 zeolite.

5. The process of claim 4 wherein the olefin in both step (a) and step (b) is propylene.

6. The product produced by the process of claim 1.
7. The product produced by the process of claim 2.
8. The product produced by the process of claim 3.
9. The product produced by the process of claim 4.
10. The product produced by the process of claim 5.

11. In the process for converting light olefin to lubricant stock by contacting the light olefin with an acidic crystalline zeolite catalyst having a silica-to-alumina mole ratio of at least 12 and a Constraint Index of about 1 to 12 at a reaction temperature of about 350° to 650° F., pressure of about 400 to 5000 psig and weight hourly space velocity of about 0.1 to 1, wherein the reaction effluent is fractionated to recover a high viscosity index lubricant oil base stock product having a boiling point above about 600° F.; the improvement which comprises:

preconditioning said zeolite catalyst by contacting fresh catalyst with light olefin at elevated temperature above 450° F. at conditioning pressure below about 100 psig to provide a conditioned catalyst, whereby said lubricant product has increased viscosity index as compared to that produced by unconditioned catalyst.

12. The process of claim 11 wherein the catalyst comprises ZSM-5 and wherein olefin or olefin mixture having an average of 3–6 carbon atoms is converted to an effluent containing at least 10 wt % lubricant oil.

13. The process of claim 12 wherein the catalyst consists essentially of acid ZSM-5 having a silica-to-alumina ratio of at least 40 to 1.

14. The process of claim 11 wherein the lubricant oil product is hydrogenated.

* * * * *